US008047548B2

(12) United States Patent
Roddis

(10) Patent No.: US 8,047,548 B2
(45) Date of Patent: Nov. 1, 2011

(54) BEARING ALIGNMENT DEVICE AND SEAL ARRANGEMENT

(75) Inventor: Alan James Roddis, Sheffield (GB)

(73) Assignee: AES Engineering Ltd., Rotherham (GB)

( * ) Notice: Subject to any disclaimer, the term of this patent is extended or adjusted under 35 U.S.C. 154(b) by 762 days.

(21) Appl. No.: 11/690,011

(22) Filed: Mar. 22, 2007

(65) Prior Publication Data

US 2007/0222158 A1  Sep. 27, 2007

(30) Foreign Application Priority Data

Mar. 27, 2006  (GB) .................. 0606068.5

(51) Int. Cl.
*F16J 15/34* (2006.01)
*F16J 15/447* (2006.01)
*F16C 23/08* (2006.01)
*F16C 33/76* (2006.01)

(52) U.S. Cl. ........ 277/348; 277/371; 277/350; 277/398; 384/497; 384/477; 384/481

(58) Field of Classification Search .......... 277/371, 277/348, 350, 398, 390, 397; 384/497, 472, 384/406, 138, 145, 481, 477, 480, 536
See application file for complete search history.

(56) References Cited

U.S. PATENT DOCUMENTS

| 1,457,584 | A | * | 6/1923 | McCuen | 384/497 |
|---|---|---|---|---|---|
| 3,971,565 | A | * | 7/1976 | Schickling et al. | 277/551 |
| 4,077,634 | A | * | 3/1978 | Durham | 277/382 |
| 5,135,235 | A | * | 8/1992 | Parmar | 277/360 |
| 5,335,921 | A | * | 8/1994 | Orlowski | 277/637 |
| 5,370,403 | A | * | 12/1994 | Sedy | 277/390 |
| 5,609,342 | A | * | 3/1997 | Peterson et al. | 277/399 |
| 5,769,604 | A | * | 6/1998 | Gardner et al. | 415/170.1 |
| 6,120,034 | A | * | 9/2000 | Kowalski et al. | 277/377 |
| 6,234,489 | B1 | * | 5/2001 | Orlowski et al. | 277/395 |
| 6,299,173 | B1 | * | 10/2001 | Lai | 277/348 |
| 6,299,174 | B1 | * | 10/2001 | Kotlyar | 277/358 |
| 6,328,528 | B1 | * | 12/2001 | Dahlheimer | 415/113 |
| 7,044,470 | B2 | * | 5/2006 | Zheng | 277/400 |
| 2007/0222158 | A1 | * | 9/2007 | Roddis | 277/345 |

* cited by examiner

*Primary Examiner* — Alison Pickard
(74) *Attorney, Agent, or Firm* — Edwin D. Schindler

(57) ABSTRACT

An alignment apparatus includes a first stator, located in a stator of a piece of rotating equipment, and a second stator couplingly connected to the first stator and able to be angularly rotated relative to the first stator. The second stator can seal an interface between a shaft and housing in the piece of rotating equipment. The alignment apparatus permits angular misalignment between a stator, a housing and a rotor shaft, and may be used, for example, in a bearing protector or an isolator installed on a Pillow Box.

14 Claims, 7 Drawing Sheets

BEARING ALIGNMENT DEVICE AND SEAL ARRANGEMENT

FIELD OF THE INVENTION

This invention relates to bearing protectors, both contacting mechanical face seal and Lip Seal type and non-contacting labyrinth seal type and their use in rotating equipment, especially devices, which can accommodate angular rotor to stator misalignment.

An example of a piece of rotating equipment which is designed to accommodate angular misalignment between the rotating shaft and stator housing is a Pillow Block, occasionally this is also referred as a Plummer Block. Pillow blocks contain a bearing, typically a spherical roller bearing, which is lubricated and sealed between the rotor to stator interface to prevent the ingress or egress of a fluid or solid to a cavity, which results in deterioration of equipment life.

Bearing protectors are often also referred to as bearing seals or bearing isolators, however, the use of such rotary seals extends well beyond the protection of a bearing in rotating equipment. Accordingly, while reference will be made below to bearing protectors, it should be understood that this term is used, as far as the invention is concerned, in connection with such having wider uses.

BACKGROUND TO THE INVENTION

The purpose of a bearing protector is to prevent the ingress of fluid, solids and/or debris from entering a bearing chamber. Equally, bearing protectors are employed to prevent the egress of fluid or solids from a bearing chamber. Essentially, their purpose is to prevent the premature failure of the bearing.

Bearing protectors generally fall into two main categories: contacting or non-contacting.

Non-contacting bearing protectors can be of repeller or labyrinth configuration. Reference is made to our co-pending labyrinth seal bearing protection application GB0415548.7 which defines a substantially non-contacting bearing protector with static shut off device.

In a non-contacting bearing protector, the rotating component typically has a complex outer profile which is located adjacent and in close radial and axial proximity to a complex inner profile of the stationary component. Together these complex profiles, in theory, provide a tortuous path preventing the passage of the unwanted materials or fluids.

Conventional labyrinth seal technology indicates the said close radial counter rotational members are substantially parallel to each other and run parallel to the centreline of the shaft. Unfortunately, labyrinth seal technology has limited effectiveness at discouraging fluid, specifically in applications such as Pillow Blocks where angular displacement is expected between the shaft and the housing.

Contacting bearing protectors can be as basic as a lip seal, or more technical such as a face/mechanical seal. Reference is also made to our co-pending mechanical seal bearing protection application GB0215750.1, which defines a substantially contacting bearing protector with an axially floating seal face against axially static seal face.

Conventional mechanical seal technology suggests that the counter rotational seal faces attached to the rotor and stator need to be both flat, substantially parallel to each other, and substantially perpendicular to the shaft axis.

Again, unfortunately, said substantially parallel and perpendicular surfaces have limited effectiveness at sealing fluid, in applications such as Pillow Blocks where angular displacement is expected between the shaft and the housing.

Pillow Blocks are commonly employed in all types of industries, as they have the advantage of being able to accommodate angular misalignment of the installed equipment. Pillow blocks typically contain one or more centrally disposed bearings contained within a split housing. Two or more said bearing(s) and Pillow Block assemblies are employed to support a longitudinal and substantially rotatable shaft. It is preferable, that the bearing is lubricated during operation, therefore a seal is required, at either side of each split Pillow Block housing, to seal the bearing lubricant. As the two Pillow Blocks are axially spaced, the respective radial distance between the two can often vary from the ideal alignment. It is this radial distance variation that results in a shaft misalignment situation.

It is therefore deemed advantageous if a mechanism is created which permits both contacting and non-contacting bearing protector types to accommodate angular shaft to housing misalignment whilst permitting the effective sealing of the bearing lubricant fluid.

Several attempts have made to satisfy this basic sealing requirement, from Schickling U.S. Pat. No. 3,971,565, Lampart U.S. Pat. No. 5,655,845 and Orlowski, U.S. Pat. No. 5,335,921 and WO 98/02669.

Orlowski U.S. Pat. No. 5,335,921, teaches a two elastomeric members located either side of a projection from a carrier, and frictionally fitted to the sides of the split pillar block. Orlowski relies on the relative elasticity of said elastomer members to accommodate angular misalignment between the carrier and pillar block housing.

Orlowski, further uses frictional wear rings connected from the carrier to the shaft to force the stationary carrier to align to the rotating shaft.

The experience reader should note several technical drawbacks with Orlowski U.S. Pat. No. 5,335,921, as follows;

the frictional rings wear between the rotating shaft and stationary carrier. The worn particles dispersed adjacent and into the sealed bearing lubrication fluid. Said contaminates deteriorate the lubrication media leading to premature bearing failure.

as the elastomeric members are resiliently mounted between the carrier and pillar block housing when the equipment is aligned, given a misalignment situation, one of the two elastomeric members will compress over part of its circumference, whilst the compression on the second elastomer is relieved over part of its circumference. Likewise, the compressive forces at the other part of both elastomers circumferences changes. This irregular circumferential compression force is transmitted through to the frictional rings, accelerating the wear.

all frictional contacting members positioned between two counter rotating surfaces wear both the member and often the surface of the rotor/stator. Such frictional rings thus wear grooves in the shaft, leading to expensive equipment refurbishment costs.

the equipment shaft to housing is angularly rotated about the centreline of the bearing. Often double spherical roller/ball bearings are employed in spilt pillar blocks. Said spherical roller bearings angularly rotate about the radius of the bearing race. Any sealing member which does not also rotate about this bearing race radius is thus resisting the angular rotation, leading to further wear, rapid deterioration of both the bearing and the equipment and failure of the equipment.

It is thus deemed to be further advantageous if said angularly accommodating mechanism, adjacent to the sealing member, does not angularly conflict with the natural angular movement of the bearing.

Furthermore, it is deemed to be advantageous to avoid the use of frictional alignment wear rings particularly adjacent to the sealed bearing lubricant fluid and not to create uneven circumferential forces around the seal member in a misaligned equipment configuration.

STATEMENTS OF THE INVENTION

According to the present invention there is provided a bearing seal device, with an integral self-aligning joint mechanism. Said self-aligning joint mechanism comprises of two stator members, the first connected to the equipment housing and a second adjacent to the rotor member which is connected to the shaft.

The self-aligning joint mechanism, specifically the interface between the first and second stator members, is designed to coincide on the extrapolated curved arc of the innermost profile of the outer bearing face, of the bearing mounted in the split pillar block, therefore the self-aligning joint of the invention does not angularly conflict with the natural angular movement of the bearing.

Preferably the first stator member of the spherical joint mechanism is connected to the split pillar block housing by a radial frictional fit from at least elastomeric member mounted in sealable engagement between said stator member and pillar block housing.

Preferably, the second stator member, of the self-aligning joint mechanism is configured to requirements of the bearing seal; contacting or non-contacting form.

Preferably, the two stator members from the self aligning joint mechanism have an elastomeric member mounted in sealable engagement between said members. Preferably, said elastomeric member is allowed to slide between two stator surfaces which run substantially parallel to the self aligning joint mechanism interface.

Preferably, in the non-contacting configuration, a rotor is positioned adjacent to the second stator member. Preferably said rotor is non-contactingly coupled to said second stator, by a radial support member.

Preferably, in the non-contacting configuration, said radial support member radially contacts the second stator and rotor and is offered in a low friction material, which may either be wearable or durable/non-wearable. If a wearable material is offered, preferably said radial support member is sited out of the fluid media being sealed.

Preferably, in the non-contacting configuration, said radial support member is axially positioned from the self-aligning joint mechanism, thereby providing an axial leverage feature, thus permitting a smaller given force to move the self-aligning joint interface of the first stator and second stator and any such elastomer frictional resistance from the sliding member sited between.

Preferably, in the non-contacting configuration, said radial support member and/or adjacent members, are under no irregular circumference stresses, given that at whatever the final spacial position the self-aligning joint, the frictional resistance from the sealing squeeze of the elastomeric member between the first and second stators, is substantially the same.

Preferably, in the non-contacting configuration, the rotor to second stator radial and/or axial interference is contactingly sealed when the shaft and rotor is idle and at rest and in non-contact when the shaft and rotor is in operation. Preferably, the rotor is rotationally driven and in sealing engagement with the shaft of the rotary equipment.

Preferably, said first stator has a radially extending cavity, on its inner most radial surface adjacent to the rotor and/or shaft. At the approximate 6 o'clock position, said radial cavity is discontinued with an orifice that communicates with the bearing chamber of the rotating equipment.

Preferably, said second stator has a radially extending cavity, on its inner most radial surface adjacent to the rotor and/or shaft. At the approximate 6 o'clock position, said radial cavity is discontinued with an orifice that communicates with the bearing chamber of the rotating equipment.

Preferably, said second stator is configured to accommodate a conventional contacting Lip/Oil seal, which contact said shaft and perform a seal function.

Preferably, said second stator is configured to accommodate a contacting face/mechanical seal bearing protector, either of single or dual faced construction, by way of example only, as shown in our corresponding GB0215750.1 application.

Preferably, said second stator is configured to accommodate a conventional non-contacting restriction bush and/or shaft contacting segmented throttle bush.

DETAILED DESCRIPTION OF THE INVENTION

The invention will now be described, by way of examples only, with reference to the accompanying drawings.

The general principle of rotary seals in accordance with the present invention may be used not only in the case where the shaft is a rotary member and the housing is a stationary member but also the reverse situation, that is to say, in which the shaft is stationary and the housing is rotary.

Furthermore, the invention may be embodied in both rotary and stationary arrangements, cartridge and component seals with metallic components as well as non-metallic components.

Figure 1:
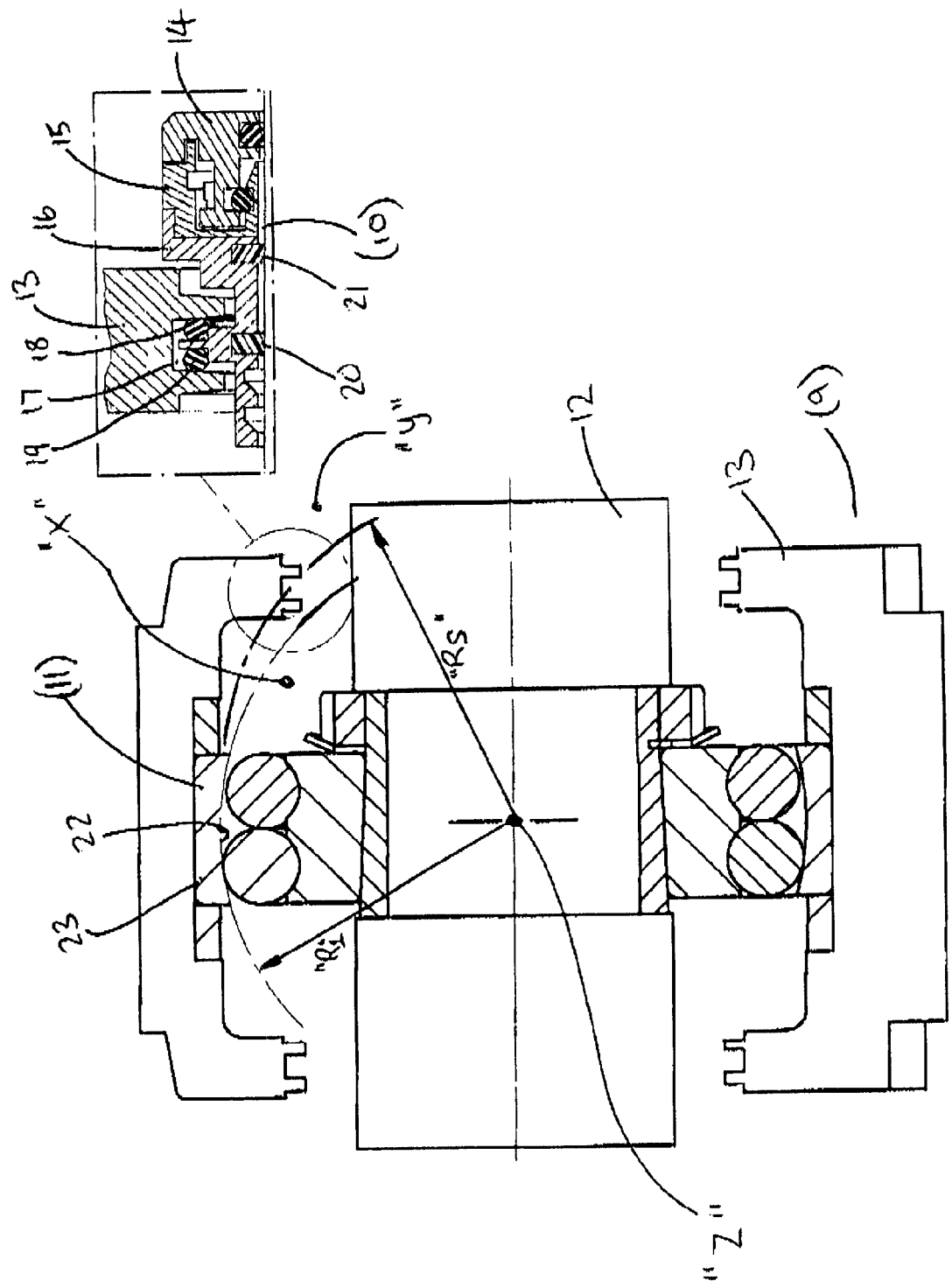
FIG. 1 is a longitudinal cross section view of a pillow block assembly with a prior art labyrinth seal bearing protector

Referring to FIG. 1 of the accompanying drawings, there is illustrated, a pillow block assembly 9 shown, by way of example only, with a prior-art bearing protector assembly 10 assumed, but not shown, to seal both axial ends of the pillow block assembly 9

The Pillow block assembly 9 includes a rotating shaft 12 and a stationary housing 13. The stationary housing 13 typically contains a bearing 11, mounted in the radial space between the shaft 12 and housing 13.

Clearly, in order to assemble the bearing 11 into the housing 13, the housing 13 is typically radially split into two halves, which are clamped together with screws (not shown).

Area "X", adjacent to the bearing 11 and at one axial end of the prior-art bearing protector assembly 10 typically contain bearing lubrication fluid, yet could also contain solid and/or foreign debris and/or atmosphere. For clarity it will herewith be termed "product substance", being used to describe the single or mixed medium.

Area "Y" at the other axial end of the bearing protector assembly 10 could also partially contain fluid, typically sprayed moisture, and/or solids and/or foreign debris and/or atmosphere, however for clarity it will herewith be termed "atmospheric substance" being used to describe the single or mixed medium.

The prior-art bearing protector assembly 10 includes a rotor member 14, which is radially and axially adjacent to stator member 15.

The stator member 15 is attached as an integral member to a carrier 16 which, extends radially outwards to engage in a radial groove 17 in Pillow Block housing 13. At either axial side of the carrier 16 are elastomeric members 18 and 19 which together with the wear rings 20 and 21, reportively allow the carrier to angularly move substantially parallel to the shaft 12 and substantially misalign with respect to the housing 13.

The experienced reader will note, that the shaft will angular pivot about point "Z", which is the point at which the centreline of the bearing 11 coincides with the centreline of the shaft 12. The reader will note that the angular rotation of the shaft 12, is typically a function of the radial distance "R1" between the pivot point "Z" and the arc of the inner most surface 22 of the outer most race 23 of the bearing assembly 11.

From FIG. 1, given the respective position of the radial groove 17 in housing 13 to the shaft pivot point "Z" it is clear that the prior-art bearing protector seal 10 angularly rotates on a different radius "Rs" to that of the bearing "R1".

This difference between "Rs" and "R1" creates a competing set of forces, which ultimately accelerate the deterioration of equipment and seal life.

Figure 2:
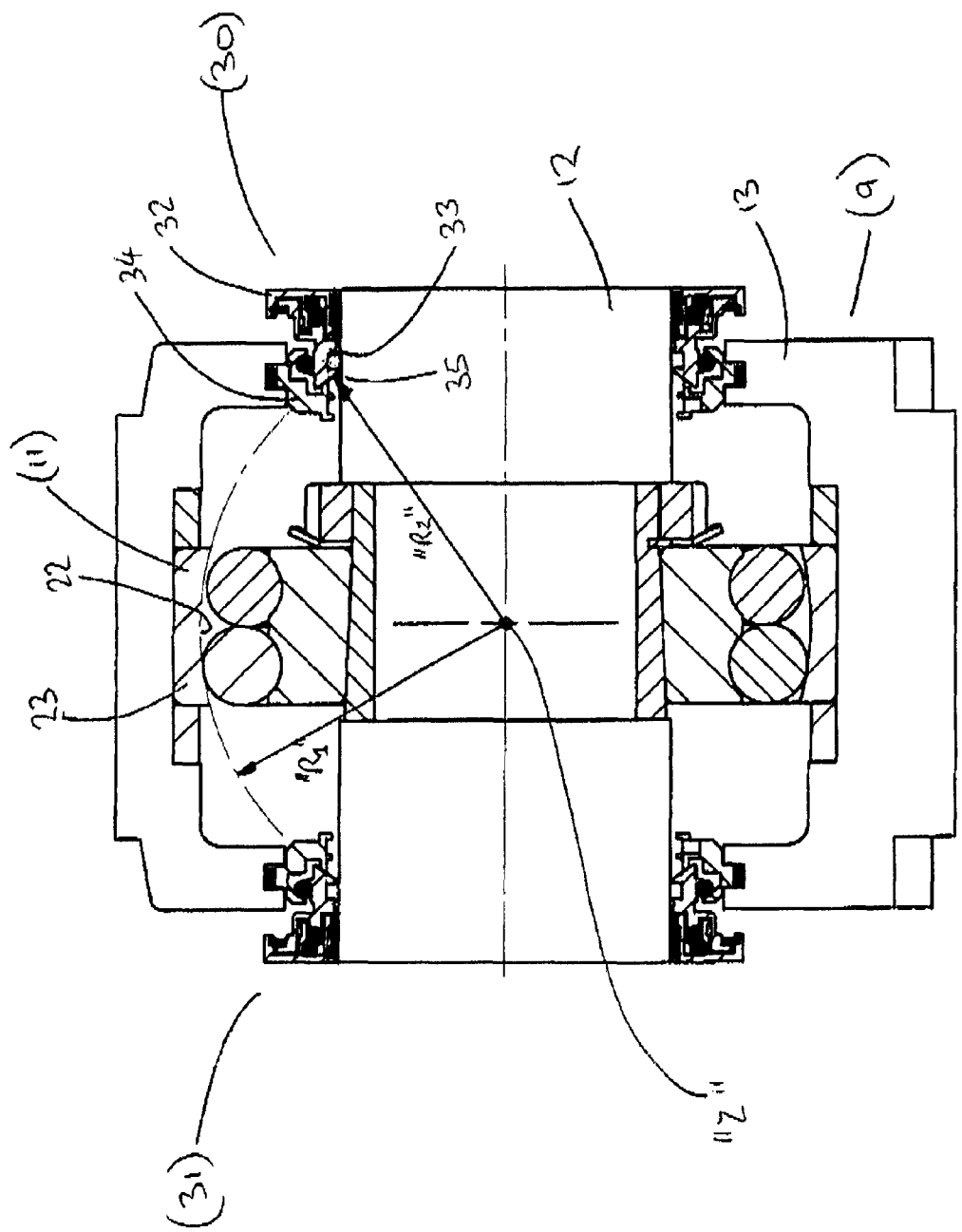
FIG. 2 is a longitudinal cross section view of a pillow block assembly with two non-contacting labyrinth seals, of the invention.

FIG. 2 is a longitudinal cross section view of a same pillow block assembly 9, as previously defined in FIG. 1, configured with two non-contacting labyrinth seal assemblies 30 and 31, of the first embodiment of the invention.

From FIG. 2, the non-contacting labyrinth seal assembly 30, comprises of a rotor 32, a floating stator 33 and a stator socket 34. The floating stator 33 is axially and radially seated on the stator socket 34, about arc 35 thus permitting the floating stator 33 to angularly misalign with respect to the stator socket 34.

The centre point of said arc 35, substantially coincides with the shaft pivot point "Z". The radius "R2" of arc 35, is substantially the same "R1" which is arc of the bearing inner most radial surface 22 of the outer most bearing race 23.

Since "R1" is the same as "R2", the angular rotation of both non-contacting labyrinth seal assemblies 30 and 31 is the same as the shaft 12 to housing 13 of the pillow block 9. As no conflict of annular rotation exists within the Pillow block 9 assembly, both seal life and equipment life is not compromised.

Figure 3:
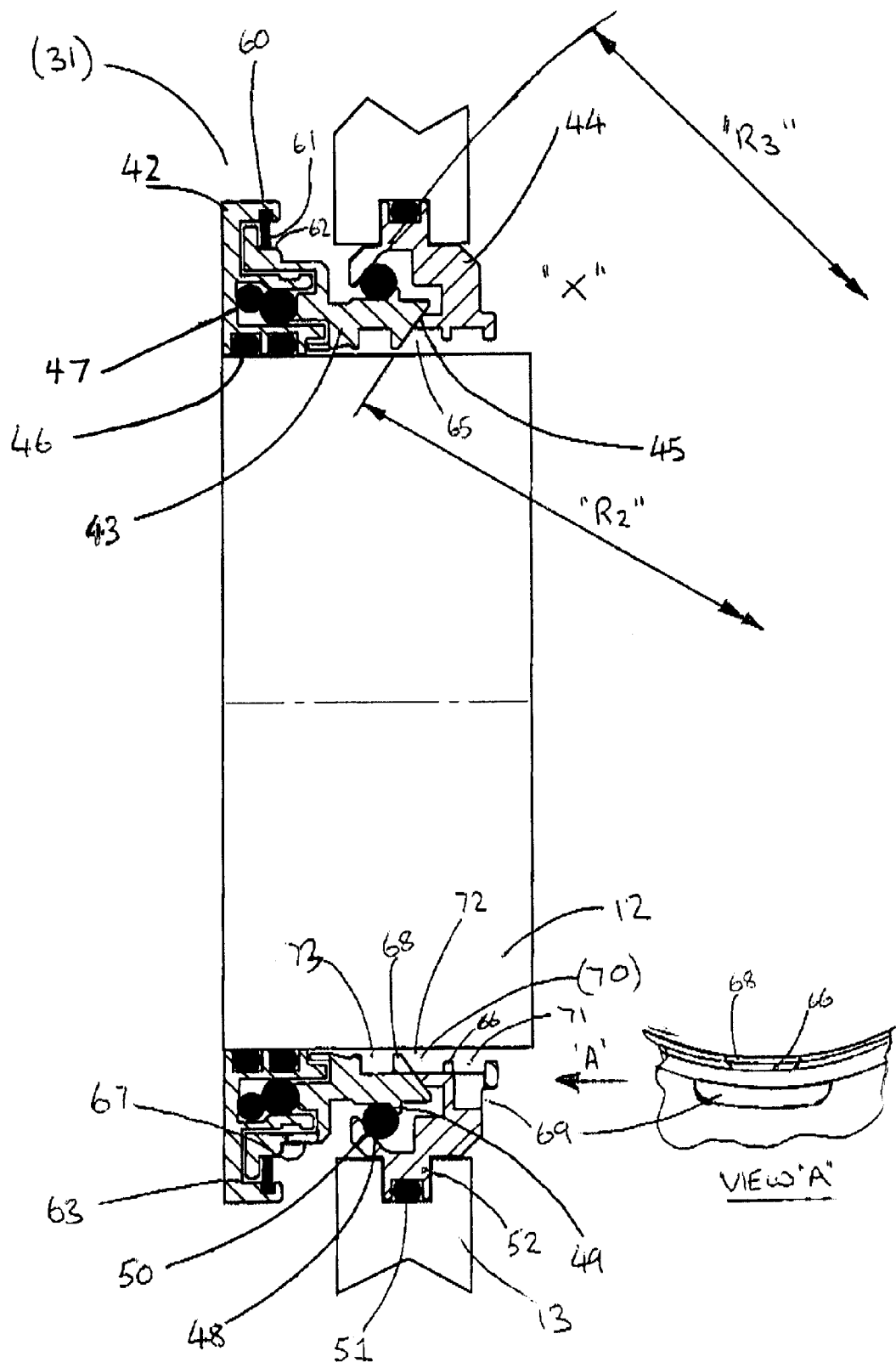
FIG. 3 shows an enlarged longitudinal cross section view of a non-contacting labyrinth seal of the of the first embodiment of the invention.

This self-aligning joint arrangement, between the floating stator 33 and stator socket 34 forms the first embodiment of the invention FIG. 3 corresponds to FIG. 2 and shows an enlarged longitudinal cross section view of a non-contacting labyrinth seal assembly 31 of the invention.

As previously described, the rotor 42 is adjacent to the floating stator 43, which is radially and axially seated on the stator socket 44. Both the floating stator 43 and stator socket 44 are seated on an arc interface 45 with radius of "R2", which is substantially the same as the shaft pivot radius "R1" from FIG. 2.

The rotor 42 is radially mounted in sealingly engagement with shaft 12 by at least one elastomeric members 46. The frictional squeeze on said elastomer 46 is typically sufficient to transmit the rotational drive from the shaft 12 to the rotor 42. Clearly, a separate drive mechanism could be employed to transmit said drive if so required.

The static shut off device 47, which seals the rotor to stator when the shaft is at rest and provides a non-contact seal when the shaft is in operation, is defined in our co-pending labyrinth seal bearing protection application GB0415548.7 and will not be further described. Clearly, the present invention may be offered with or without such a static shut off feature or an equivalent.

The reader will understand that as long as there is a sufficient axial force maintaining the spherical seating relationship between the floating stator 43 and stator socket 44, a seal could be obtained at said arc interface 45 of the first embodiment. However, given the likelihood of equipment vibration, tolerancing and general uncertainties associated with operating rotating equipment, it is preferable that the second embodiment of the invention, is employed in the assembly, as herewith described.

On the outer most radial surface of the floating stator 43, is an elastomeric member 48. Said elastomeric member is preferably that of a solid deformable toroid, however could equally be that of a hollow deformable toroid or any form of sealing and/or axially engerising configuration. Preferably, any such member 48 should have low coefficient of friction properties.

Said elastomer 48 is sealingly engaged to the outer circumference of the floating stator 43. Preferably, said floating stator 43 incorporates at least one radially extending portion, which abuts to said elastomer 48.

Preferably, the stator socket 44 incorporates a radially extending surface 50, preferably an arc form with radius of "R3", which is substantially parallel to "R2".

Given the substantially parallel feature, preferably the radial distance between "R2" and "R3" is constant and of a smaller distance than the cross section of elastomer 48. This smaller distance between the stator socket 44 and floating stator 43 creates a radial sealing squeeze on the elastomer cross section. Preferably said radial squeeze is between 0.995% and 0.80% of the elastomer 48 cross section.

The substantially parallel surface 50 of the stator socket 44 to the seating arc 45 between the floating stator 43 and stator socket 44, with a solid deformable toroid in sealingly engagement in the radial space in-between, defines the second embodiment of the invention.

The experienced reader will therefore see the advantage of the second embodiment of the invention in that for any given angular rotational displacement of the stator socket 44 to floating stator 43, elastomer 48 provides a constant, uniform sealing engagement between the two parts 44 and 43. Said uniform sealing is a result of a uniform force applied to said elastomer 48 which is constant around the circumference of the elastomer 48. Thus said elastomer 48 does not inflict forces and stresses on other members within the Pillow Block arrangement, which create undesirable effects on seal wear, seal life and equipment life. This means that the floating stator 43, can be positioned in any angular misalignment condition, and there is no, spring-like force, trying to move to collide with the counter rotating rotor 42. Furthermore, the frictional resistance of the elastomer 48 with stator socket 44 and floating stator 43 is sufficient to overcome the forces of gravity, acting on the floating stator 43, thus again preventing contact the rotor 42.

The coupled stator assembly 70, comprising of the floating stator 43 and the socket stator 44, is axially and radially coupled, yet both parts are permitted to angularly swivel as previously discussed. Clearly, in addition, both parts could also be rotationally coupled, by example only, a drive pin (not shown) in the floating stator 43 operating in a clearance slot (not shown) in the socket stator 44.

From FIG. 3, the stator socket 44 is radially located in the Pillow block housing 13 and preferably in sealing engagement using one or more elastomeric members 51.

The frictional sealing squeeze on said elastomer 51 is typically sufficient to transmit the anti-rotational drive from the housing 13 to the stator socket 44. Clearly, a separate drive mechanism could be employed to transmit said drive if so required.

Preferably, as shown, the stator socket 44, is also axially retained given the width of the radially extending portion on the outer most circumferential part 52, engages in the radially extending groove of the inner most portion of the housing 13.

Clearly, the radial location, axial location and sealing arrangement between the stator socket 44 and housing 13 can be changed to suit a specific application or desired equipment configuration. Clearly, the invention anticipates other such location and sealing engagement of these two members and by way of example only (not shown), the stator socket could incorporate a radially extending flange containing one or more axially extending holes. Said flange could incorporate a sealing member, like a gasket allowing the socket stator to be secured to the Pillow block housing by a bolt located through the flange hole into a corresponding threaded hole in the pillow block.

Referring back to FIG. 3. Non-contacting labyrinth seals rely on a close radial clearance between the rotor 42 and stator 43, and, where possible, a series of radially and axially extending castellations are incorporated in both counter rotational members, to create a tortuous path of resistance for fluid to pass.

Preferably, the radial and axial clearances between the rotor 42 and 43 should be kept constant, around the entire circumference of the two parts. Clearly, if the shaft 12 is misaligned to the housing 13, the rotor 42 will be misaligned to the housing 13, since the rotor 42 is concentrically mounted to the shaft. During equipment assembly therefore, the rotor will be radially displaced with respect to the floating stator 43, as a result of angular movement of the shaft 12. If this radial displacement is larger than the radial clearance between the rotor 42 and floating stator 43, the floating stator 43 radially follows the rotor 42 effortlessly until the final running position is reached. The effortless movement of the floating stator 43 is due to the axial location of the rotor 42 with respect to the arc seat 45 of the floating stator and the resulting leverage advantages to overcome the slight frictional resistance of the assembly.

Clearly, as both rotor 42 and stator 43 parts are typically made from a wearing material, such as phosphor bronze, any slight and brief contact between the two, during equipment start-up, is typically acceptable. The point to note is that since there is no "spring like" forces, acting on the floating stator to maintain said counter-rotational contact, the contact is brief—typically that of a split second, thereafter, returning to a non-contact operation.

The third embodiment of the invention however, offers an additional feature, if required, to eliminate any such contact between the rotor 42 and floating stator 43.

From FIG. 3, the rotor 42 has a radially extending groove 60 which houses an alignment shield 61. The inner most radial feature of said alignment shield 61 is in close radial proximity to the outer most circumference of the floating stator 43.

Preferably, the alignment shield 61, is manufactured from a material with poor wear resistance and low co-efficient of friction, typically a plastic such as Teflon or a Teflon derivative. Teflon is a trade name of Dupont.

Said alignment shield 61 sets a constant radial clearance around the circumference of the rotor 42 and stator 43, therefore ensuring that if the rotor 42 radially displaces given angular shaft 12 movement, the floating stator 43, radially follows the rotor 42. Any start-up contact, remains slight and brief but is now made between the sacrificial alignment shield 61 and floating stator 43.

Furthermore, the sacrificial alignment shield 61 is out of contact with the sealed bearing fluid/lubrication at position "X" in FIG. 3. Therefore, unlike the prior-art designs, specifically the wear rings, item 24 of Orlowski U.S. Pat. No. 5,335,921, any debris from such counter-rotational contact can not contaminate the bearing fluid or add heat to in, which can lead to the breakdown of the lubricant properties.

The experienced reader will relate to the clear advantage of such a third embodiment, particularly the leverage advantage given the axial distance between the alignment shield 61 and seat interface 45. However, the added benefit of the alignment shield 61 is that it aids the axial unitisation the rotor 42 and floating stator 43 for assembly/disassembly onto the shaft, whilst protecting against moisture entering the radial gap 63 adjacent to said alignment shield 61.

From FIG. 3, the floating stator 43 has an outboard orifice 67, positioned at the 6 o'clock position when viewing the assembly. This orifice 69 facilitates the drainage of any moisture that migrations past the alignment shield 61 into the radial gap 63. However, from FIG. 3, the fourth embodiment of the invention is also apparent, which relates to the unique orifice feature 68 and 69 adjacent to the bearing fluid/lubrication "X".

The socket stator 44 includes a radially extending velocity reducing cavity 71. As bearing fluid enters said circumferential cavity 71, typically in the form of splash droplets generated from the bearing's rotation, the bearing fluids velocity changes allowing gravity to move said fluid around the circumference of the cavity to the 6 o clock position. The socket stator 44 has at least one orifice, positioned at the 6 o'clock position, which communicates from the velocity reducing cavity 71 to the bearing cavity "x". This communication orifice permits bearing fluid to be drained away from said cavity 71, back to the bearing cavity.

A second velocity reducing cavity 72 is formed between the radially extending seat arc surface 45 of the floating stator 43 and the radially extending feature 65 of the inner most surface of the socket stator 44. Again, an orifice 66, sited at the 6 o'clock position, communicates from said cavity 65 to said cavity 71.

A third velocity reducing cavity is formed by a radially extending cavity 73 on the inner most surface in the floating stator 43, with an orifice 68, communicating from said cavity 73 to said cavity 72

The fourth embodiment of the invention thereby discloses an unique and highly effective velocity reducing series contained within a coupled stator assembly. Said velocity reducing series comprises of two or more, velocity reducing cavities formed between the shaft 12 and the coupled stator assembly 70. Said velocity reducing cavities are connected by two or more communication orifices, preferably in line with one another and position at the 6 o'clock position in the coupled stator assembly, thus permitting bearing fluid/lubrication to drain back to the bearing chamber of an item of rotating equipment.

Figure 4:
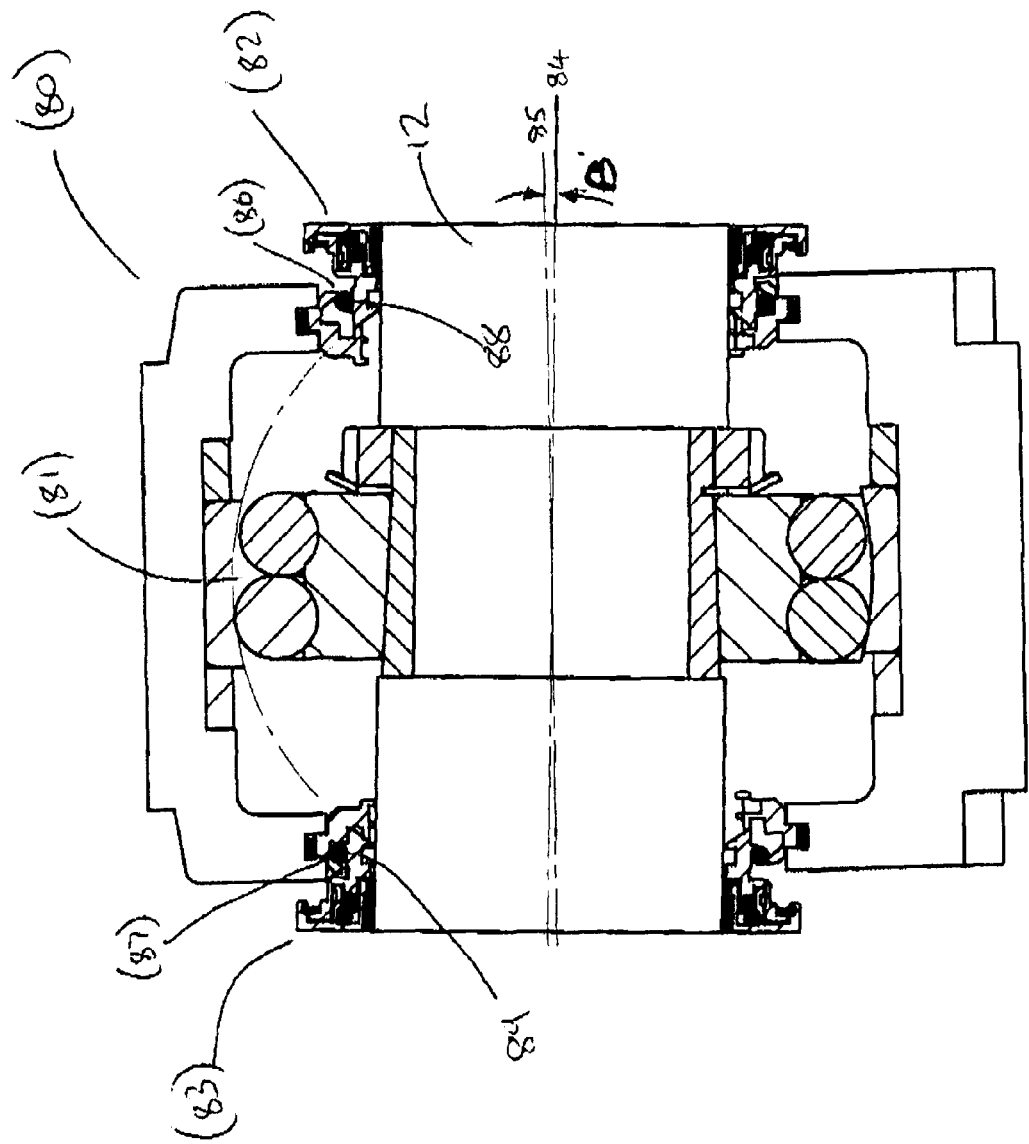
FIG. 4 corresponds to FIG. 2 and is a longitudinal cross section view of a pillow block assembly with the shaft angularly misaligned.

FIG. 4 corresponds to FIG. 2 and is a longitudinal cross section view of a pillow block assembly 80 containing a bearing assembly 81 and two non-contacting labyrinth seal assemblies 82 and 83 of the invention.

FIG. 4 shows the shaft 12 with shaft axis 84 angularly misaligned with respect to the bearing housing 13 with bearing housing axis 85, through angle "B". Typically, angle B can be engineered to be anything the application demands, but typically it ranges from 0 degrees to 5 degrees.

As shown in FIG. 4, the coupled stator assemblies 86 and 87 accommodate said angular misalignment, specifically sealing elastomers 88 and 89 remain in sealingly contact with their respective coupled stator sealing surfaces.

Figure 5:
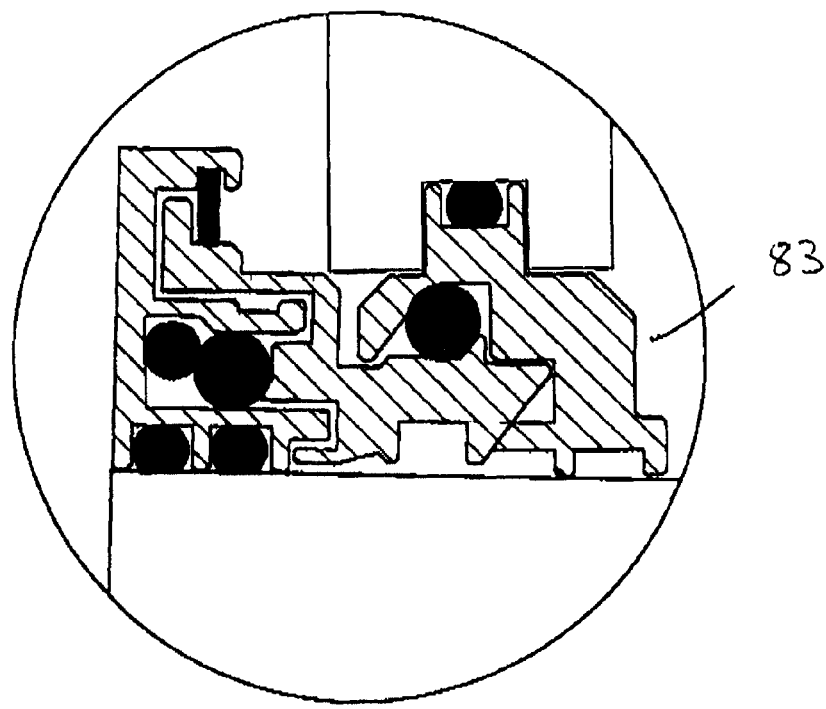
FIG. 5 corresponds to FIG. 4 and shows a partial longitudinal cross section of the invention, showing the seal in a positive angularly misaligned condition.

FIG. 5 corresponds to FIG. 4 and shows a partial longitudinal cross section of the invention, showing an enlarged view of the non-contacting labyrinth seal 83 in a positive (radially upwards) angular shaft mis-aligned condition.

Figure 6:
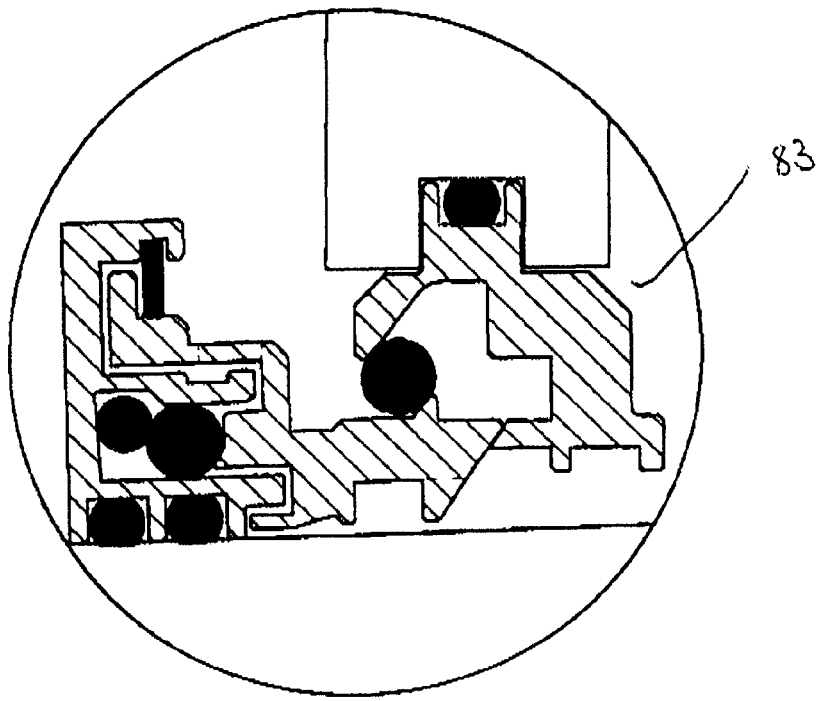
FIG. 6 corresponds to FIG. 4 and shows a partial longitudinal cross section of the invention, showing the seal in a negative angularly misaligned condition.

FIG. 6 corresponds to FIG. 4 and shows a partial longitudinal cross section of the invention, showing an enlarged view of the non-contacting labyrinth seal 83 in a negative (radially downwards) angular mis-aligned condition.

Figure 7:
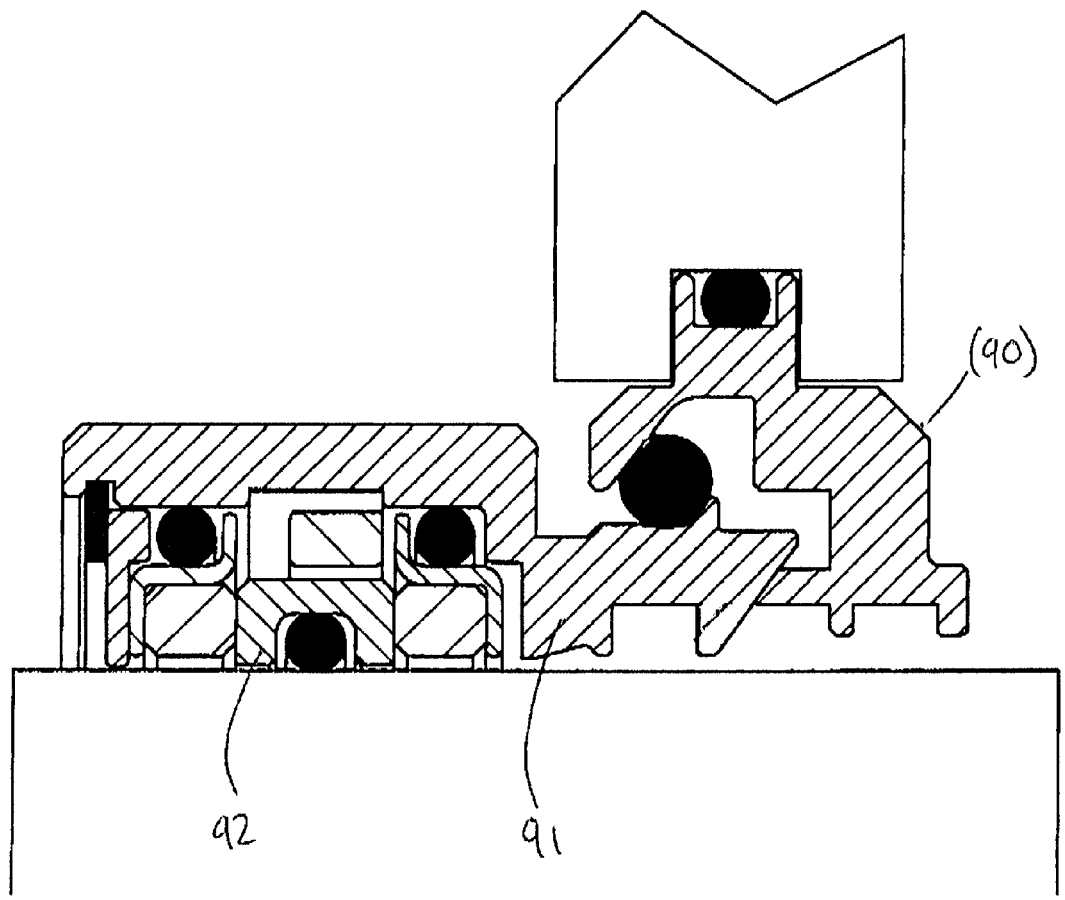
FIG. 7 shows an enlarged longitudinal cross-section view of a contacting face seal of the invention.

FIG. 7 shows an enlarged partial longitudinal cross-section view of the fifth embodiment of the invention, illustrating the coupled stator assembly 90, specifically the floating stator 91 adapted to house a contacting face seal assembly (92), as substantially disclosed, but not limited to, the invention of our co-pending GB0215750.1 application.

Figure 8:
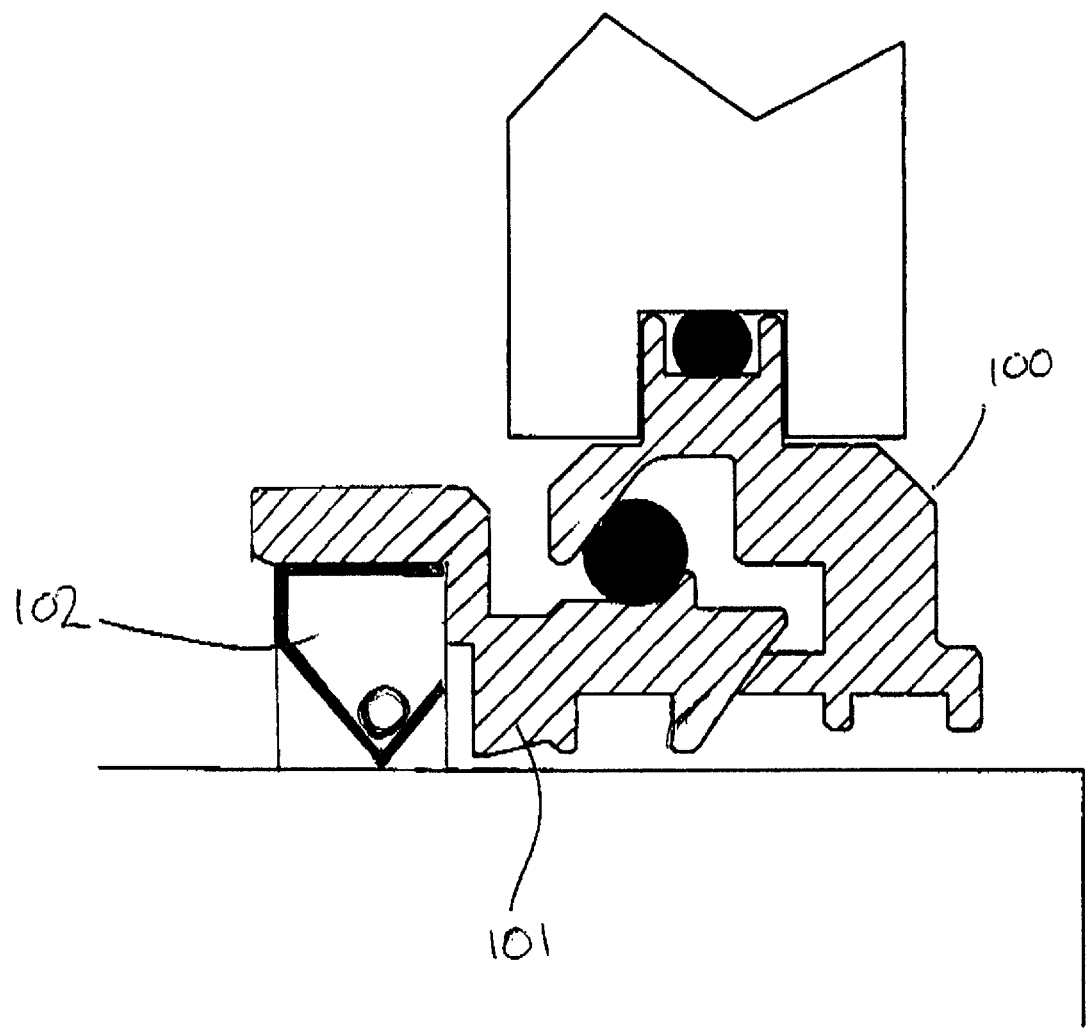
FIG. 8 shows an enlarged longitudinal cross-section view of a contacting Lip seal of the invention.

FIG. 8 shows an enlarged partial longitudinal cross-section view of the sixth embodiment of the invention, illustrating the coupled stator assembly 100, specifically the floating stator 101 adapted to house a contacting Lip seal (102).

The six embodiments of the invention, described and shown, clearly show innovative step and considerable advantages, over the existing prior art sealing, of rotating equipment, such as pillow blocks, which, by their nature, create angular shaft to housing misalignment.

What is claimed is:

1. A bearing protector for use with a bearing between a rotary shaft and a stator housing, said stator housing accommodating angular misalignment between said rotary shaft and said stator housing about a pivot point at which a centerline of the bearing coincides with a centerline of said rotary shaft, said bearing protector comprising:
a first stator locatable into said stator housing; and,
a second stator radially and axially seated on said first stator and mounted for angular rotation relative thereto about said pivot point, said first stator and said second stator being adjustable relative to one another for providing adjustment to misalignment with an interface between said first stator and said second stator coinciding on an extrapolated curved arc of an innermost profile of an outer face of the bearing, so that the interface between said first stator and said second stator forms an arc having a radius that is substantially similar to an arc radius of the bearing.

2. The bearing protector according to claim 1, wherein an interface between said first stator and said second stator coincides with a natural angular movement of a bearing.

3. The bearing protector according to claim 1, wherein said first stator contains at least one elastomer member mounted in a sealable engagement between said first stator and said stator housing.

4. The bearing protector according to claim 1, further comprising a non-contacting bearing seal with said second stator being configured to requirements of said non-contacting bearing seal.

5. The bearing protector according to claim 4, wherein said non-contacting bearing is a labyrinth seal.

6. The bearing protector according to claim 1, further comprising a contacting bearing seal with said second stator being configured to requirements of said contacting bearing seal.

7. The bearing protector according to claim 6, wherein said contacting bearing seal is a mechanical face seal.

8. The bearing protector according to claim 6, wherein said contacting bearing seal is a lip seal.

9. The bearing protector according to claim 1, wherein said first stator and said second stator contain at least one deformable solid toroid member mounted in a sealable engagement between said first stator and said second stator.

10. The bearing protector according to claim 9, wherein said deformable toroid member is slidable on a surface of said first stator member, said surface running substantially parallel to a seating interface of said first stator and said second stator.

11. The bearing protector according to claim 9, wherein said deformable toroid member is slidable on a surface of said second stator member, said surface running substantially parallel to a seating interface of said first stator and said second stator.

12. The bearing protector according to claim 9, wherein said deformable toroid member is slidable on surfaces of both said first stator member and said second stator member, said surfaces running substantially parallel to a seating interface of said first stator and said second stator.

13. The bearing protector according to claim 1, further comprising an alignment support member, said second stator being in radial contact with said alignment support member with said alignment support member being axially displaced from a seating interface of said first stator and said second stator.

14. The bearing protector according to claim 13, wherein said alignment support member is located outside of a fluid media being sealed.

* * * * *